United States Patent
Tsioras

(10) Patent No.: US 6,243,456 B1
(45) Date of Patent: Jun. 5, 2001

(54) ETSI INTELLIGENT NETWORK CAPABILITY SET 1 TRIGGER DETECTION POINTS ON A SERVICE SWITCHING POINT

(75) Inventor: Constantine Nicholas Tsioras, Lisle, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/105,530

(22) Filed: Jun. 26, 1998

Related U.S. Application Data

(60) Provisional application No. 60/057,591, filed on Aug. 29, 1997.

(51) Int. Cl.$^7$ .......................................................... H04M 7/00
(52) U.S. Cl. ........................ 379/230; 379/207; 379/220; 370/522
(58) Field of Search ..................................... 379/229, 230, 379/219, 220, 221, 207, 201; 370/410, 522, 523, 524, 328

(56) References Cited

U.S. PATENT DOCUMENTS 6,044,265 * 3/2000 Roach, Jr. .............................. 455/419
6,167,064 * 12/2000 Cohn et al. ........................... 370/522

* cited by examiner

*Primary Examiner*—Fan Tsang
*Assistant Examiner*—Benny Q. Tieu
(74) *Attorney, Agent, or Firm*—Jack R. Penrod

(57) ABSTRACT

A method and apparatus for setting up and executing trigger detection points that implement a previously unimplemented ETSI intelligent network capability set 1. Thus, the requirements of this ETSI intelligently networking standard are realized in a fast and innovative way in hardware and software.

15 Claims, 25 Drawing Sheets

```
SCREEN 1 of 1              COMMUNICATION SWITCH
intun                      OFFICE DATA ADMINISTRATION
(6304)      UNCONDITIONAL TRIGGER DETECTION POINT DEFINITIONS

*1. ACCESS TYPE        TGRP       {POTS, ISDN, TGRP, PBX, IPBX}
*2. ACCESS ID          453        {number}
*3. BEARER SERV GRP    NULL       {NULL, 3P1, 64KBU, SPCH, BCHPS, 7KHZ}
*4. TDP                2          {1-18}

5. TT_INDEX           54345      {1-65535}
 6. TDP TYPE           N          {Request, Notification}
```

| \multicolumn{5}{c}{BCSM DP TYPES} |
|---|---|---|---|---|
| DP TYPE | ARMING MECHANISM | CRITERIA | IN SERVICE RELATIONSHIP | SUSPENSION |
| TDP-R | STATIC | SPECIFIC TO DP | INITIATE CONTROL RELATIONSHIP | YES |
| TDP-N | STATIC | SPECIFIC TO DP | INITIATES AND TERMINATES MONITOR RELATIONSHIP | NO |
| EDP-R | DYNAMIC | NONE | WITHIN CONTEXT OF EXISTING CONTROL RELATIONSHIP | YES |
| EDP-N | DYNAMIC | NONE | WITHIN CONTEXT OF EXISTING CONTROL OR MONITOR RELATIONSHIP | NO |

*FIG. 2*

DP PROCESSING DECISION TABLE

| SCENARIO | TDP TYPE | EDP TYPE | EXISTING RELATIONSHIP | PROCESSING |
|---|---|---|---|---|
| 1 | NOT ARMED | NOT ARMED | DON'T CARE | CONTINUE |
| 2 | TDP-R | NOT ARMED | NO | INITIATING DP REQUEST |
| 3.a | TDP-R | NOT ARMED | CONTROL | CONTINUE (IGNORE TDP) |
| 3.b | TDP-R | NOT ARMED | MONITOR | INITIATING DP REQUEST |
| 4 | TDP-N | NOT ARMED | DON'T CARE | ONE-WAY DP NOTIFICATION |
| 5.a | NOT ARMED | EDP-R | CONTROL | SUBSEQUENT DP REQUEST |
| 5.b | NOT ARMED | EDP-R | MONITOR | ERROR CASE - CONTINUE (IGNORE EDP) |
| 6 | NOT ARMED | EDP-N | CONTROL OR MONITOR | SUBSEQUENT DP NOTIFICATION, IF >= 1 ARMED EDPs REMAINING, OR TERMINATING DP NOTIFICATION, IF LAST ARMED EDP |
| 7 | NOT ARMED | EDP-R/N | NO | ERROR CASE - CONTINUE (IGNORE EDP) |
| 8 | TDP-N | EDP-N | CONTROL OR MONITOR | PROCESS a AND b:<br>a) FOR EDP, PROCESS AS SCENARIO 6<br>b) FOR TDP, ONE-WAY DP NOTIFICATION, PROCESS AS SCENARIO 4 |
| 9 | TDP-N | EDP-R/N | NO | ERROR CASE - IGNORE EDP AND PROCESS TDP AS SCENARIO 4 |
| 10.a | TDP-N | EDP-R | CONTROL | PROCESS a AND b:<br>a) FOR TDP, ONE-WAY DP NOTIFICATION, PROCESS AS SCENARIO 4<br>b) FOR EDP, SUBSEQUENT DP REQUEST, PROCESS AS SCENARIO 5.a |
| 10.b | TDP-N | EDP-R | MONITOR | ERROR CASE - IGNORE EDP AND PROCESS TDP AS SCENARIO 4 |
| 11.a | TDP-R | EDP-N | CONTROL | PROCESS a AND b:<br>a) FOR EDP, SUBSEQUENT DP NOTIFICATION, PROCESS AS SCENARIO 6<br>b) IGNORE TDP |
| 11.b | TDP-R | EDP-N | MONITOR | PROCESS a AND b:<br>a) FOR EDP, PROCESS AS SCENARIO 6<br>b) FOR TDP, INITIATING DP REQUEST |
| 12 | TDP-R | EDP-R/N | NO | ERROR CASE - IGNORE EDP AND PROCESS EDP AS SCENARIO 2 |
| 13.a | TDP-R | EDP-R | CONTROL | IGNORE TDP AND PROCESS EDP AS SCENARIO 5.a |
| 13.b | TDP-R | EDP-R | MONITOR | ERROR CASE - IGNORE EDP AND PROCESS TDP AS SCENARIO 3.b |

FIG. 3

```
SCREEN 1 of 1              COMMUNICATION SWITCH
intun                     OFFICE DATA ADMINISTRATION
(6304)         UNCONDITIONAL TRIGGER DETECTION POINT DEFINITIONS

*1. ACCESS TYPE         TGRP       {POTS, ISDN, TGRP, PBX, IPBX}
*2. ACCESS ID           453        {number}
*3. BEARER SERV GRP     NULL       {NULL, 3P1, 64KBU, SPCH, BCHPS, 7KHZ}
*4. TDP                 2          {1-18}

5. TT_INDEX            54345      {1-65535}
 6. TDP TYPE            N          {Request, Notification}
```

*FIG. 8A*

```
SCREEN 1 of 1              COMUNICATION SWITCH
intun                    OFFICE DATA ADMINISTRATION
(6304)         UNCONDITIONAL TRIGGER DETECTION POINT DEFINITIONS

*1. ACCESS TYPE           PBX          {POTS, ISDN, TGRP, PBX, IPBX}
*2. ACCESS ID             102          {number}
*3. BEARER SERV GRP       NULL         {NULL, 3P1, 64KBU, SPCH, BCHPS, 7KHZ}
*4. TDP                   1            {1-18}

5. TT_INDEX              34343        {1-65535}
 6. TDP TYPE              R            {Request, Notification}
```

*FIG. 9A*

```
SCREEN 1 of 1              COMMUNICATION SWITCH
intun                     OFFICE DATA ADMINISTRATION
(6304)        UNCONDITIONAL TRIGGER DETECTION POINT DEFINITIONS

*1. ACCESS TYPE           IPBX          {POTS, ISDN, TGRP, PBX, IPBX}
*2. ACCESS ID             202           {number}
*3. BEARER SERV GRP       SPCH          {NULL, 3P1, 64KBU, SPCH, BCHPS, 7KHZ}
*4. TDP                   1             {1-18}

5. TT_INDEX              35353         {1-65535}
 6. TDP TYPE              R             {Request, Notification}
```

*FIG. 10A*

```
SCREEN 1 of 1              COMMUNICATION SWITCH
intan                   OFFICE DATA ADMINISTRATION
(6300)      CONDITIONAL "AND" TRIGGER DETECTION POINT DEFINITIONS

*1. ACCESS TYPE         ISDN        {POTS, ISDN, TGRP, PBX, IPBX, EXCH}
*2. ACCESS ID           6911000     {number}
*3. BEARER SERV GRP     SPCH        {NULL, 3P1, 64KBU, SPCH, BCHPS, 7KHZ}
*4. TDP                 4           {1-18}

5. TT_INDEX            34567       {1-65535}
 6. TDP TYPE            R           {Request, Notification}

CRITERIA FOR "AND" EXPRESSION

7. RECEIVED DIGITS     _____
 8. CALLING PARTY NUMBER _____
 9. CLASS OF SERVICE    _____
10. CAUSE               _____
11. NATURE OF ADDRESS   INTL
12. BEARER CAPABILITY   SPEECH
```

*FIG. 11A*

```
SCREEN 1 of 1              COMMUNICATION SWITCH
intan                    OFFICE DATA ADMINISTRATION
(6300)      CONDITIONAL "AND" TRIGGER DETECTION POINT DEFINITIONS

*1. ACCESS TYPE        POTS        {POTS, ISDN, TGRP, PBX, IPBX, EXCH}
*2. ACCESS ID          7178345     {number}
*3. BEARER SERV GRP    NULL        {NULL, 3P1, 64KBU, SPCH, BCHPS, 7KHZ}
*4. TDP                4           {1-18}

5.  TT_INDEX           3020        {1-65535}
6.  TDP TYPE           R           {Request, Notification}

CRITERIA FOR "AND" EXPRESSION
7.  RECEIVED DIGITS         911        _____
8.  CALLING PARTY NUMBER               _____
9.  CLASS OF SERVICE                   _____
10. CAUSE                              _____
11. NATURE OF ADDRESS                  _____
12. BEARER CAPABILITY                  _____
```

*FIG. 12A*

```
SCREEN DISPLAY              COMMUNICATION SWITCH
intor                    OFFICE DATA ADMINISTRATION
(6302)         CONDITIONAL "OR" TRIGGER DETECTION POINT DEFINITIONS

*1. ACCESS TYPE        EXCH      {POTS, ISDN, TGRP, PBX, IPBX, EXCH}
*2. ACCESS ID          0         {number (0 if ACCESS TYPE = EXCH)}
*3. BEARER SERV GRP    NULL      {NULL, 3P1, 64KBU, SPCH, BCHPS, 7KHZ}
*4. TDP                3         {1-18}

5. CRITERIA FOR "OR" EXPRESSION
     C/R    DIGITS            COS        CAUSE      NOA      BEARER     TTIDX    T
  1) RCD   1430    ___        ___        ___        ___      ___        13003    R
  2) RCD   1432    ___        ___        ___        ___      ___        13004    R
  3) RCD   1435    ___        ___        ___        ___      ___        13005    R
  4) ___   ___     ___        ___        ___        ___      C64KB      100      R
  5) ___   ___     ___        ___        ___        ___      R64KB      101      R
  6) ___   ___     ___        ___        ___        ___      ___        ___      _
  7) ___   ___     ___        ___        ___        ___      ___        ___      _
  8) ___   ___     ___        ___        ___        ___      ___        ___      _
  9) ___   ___     ___        ___        ___        ___      ___        ___      _
 10) ___   ___     ___        ___        ___        ___      ___        ___      _
```

*FIG. 13A*

```
SCREEN DISPLAY           COMMUNICATION SWITCH
intno                  OFFICE DATA ADMINISTRATION
 (6301)      CONDITIONAL "NOT" TRIGGER DETECTION POINT DEFINITIONS

*1. ACCESS TYPE        EXCH        {POTS, ISDN, TGRP, PBX, IPBX, EXCH}
 *2. ACCESS ID          0           {number (0 if ACESS TYPE = EXCH)}
 *3. BEARER SERV GRP    NULL        {NULL, 3P1, 64KBU, SPCH, BCHPS, 7KHZ}
 *4. TDP                7           {1-18}

5. TT_INDEX           23435       {1-65535}
  6. TDP TYPE           R           {Request, Notification}

CRITERIA FOR "NOT" EXPRESSION

7. RECEIVED DIGITS    _____
  8. CALLING PARTY NUMBER _____
  9. CLASS OF SERVICE   _____
 10. CAUSE              _____
 11. NATURE OF ADDRESS  INTL
 12. BEARER CAPABILITY  _____
```

*FIG. 14A*

Gltdp7tbl = 355 rIRCON_TDP

```
*table_no    = 355
 operator    = NOT
 next_table  = 0
 prev_table  = 0
 tt_idx      = 23435
 tdp_type    = REQUEST
 crit_pres   = [00010000] (0x10)
 len_recvdigs =
 recvdigs    =
 len_cli     =
 cli         =
 cos         =
 cause_val   =
 noa         = INTL
 bearer_cap  =
```

"AT DP7 (OAnswer), THIS EXCHANGE WILL INITIATE AN SCF QUERY (Request) IF NATURE OF ADDRESS = 'INTL'."

*FIG. 14B*

```
                        GLBL1-1
SCREEN DISPLAY     RECENT CHANGE   ?.??  ?????
              INAP TRIGGER TABLE INDEX

*1. DEST TYPE       ___   {FREEPHONE, ECONOMY, ASSIST, IODCFREE, ETSIDP3}
*2. SERV TYPE       ___   {1-255}
 3. TRIGGER TABLE INDEX ___ {1-65535}
```

FIG. 15A rlATT_TTI

*desttype
*servtype
tt_idx

*FIG. 15B*

```
SCREEN DISPLAY            GLBL1-1
                RECENT CHANGE  5.11 DAITT
        INTELLIGENT NETWORK TRIGGER TABLE

*1. TRIGGER TABLE INDEX  ____    {1-65535}    (2 bytes)   ──→ NEW FIELD
  2. ETSI SERVICE KEY     ____    {0..2^31 -1} (4 bytes)   ──→ NEW FIELD
  3. SERV KEY             ____    {RECVNUM, CLI, CID, ICID}
  4. RECNUM MODTBLX       ____
  5. SHORT REANSWER       __
 #6. SERV LOC             ____    {ETSI is added}
 #7. ALT SERV LOC         ____
  8. ALT DEST RTG IND     __
  9. TRANSTYPE            ____
 10. IN CALL TIMEOUT      __
 11. SERV FILTER          _
 12. ASSIST               _       {N, Y}                   ──→ NEW FIELD
```

*FIG. 16A* rIIN_TT

*tt_idx
etsi_skey
serv_key
recv_modx
sh_reans
servloc
alt_servloc
alt_destrout
transtype
time_in_call
serv_filter
assist

*FIG. 16B*

ETSI INTELLIGENT NETWORK CAPABILITY SET 1 TRIGGER DETECTION POINTS ON A SERVICE SWITCHING POINT

CROSS-REFERENCE TO RELATED APPLICATIONS

This application claims priority of Provisional application Ser. No. 60/057,591 which was filed Aug. 29, 1997. This application is also related to U.S. application Ser. No. 09/056,402 entitled ETSI Intelligent Network Capability Set 1 Intelligent Network Application Protocol Service Switching Point Finite State Machine which is commonly assigned to Lucent Technologies.

FIELD OF INVENTION

This invention relates to intelligent network systems and more particularly to European Telecommunications Standards Institute (ETSI) enumerated detection points which aid call processing, and to detection points enumerated as part of ETSI intelligent network capability set number one.

BACKGROUND

A previous system had only one intelligent network trigger detection point implemented, which was termed an analyze information trigger detection point. The analyze information trigger detection point (TDP) was 'armed' on its supporting service switching point (SSP). When certain criteria were satisfied, this TDP 'fired' and the SSP queried its corresponding service control point (SCP) for further instructions related to this single trigger detection point for the instant telephone call.

ETSI ETS-300 374-1 Annex C specifies an intelligent network capability set number one (IN-CS1). Eight capabilities are specified in this IN-CS1: collect information, analyze information, route select failure, busy, no answer, answer, disconnect and abandon. It is worth noting that the analyze information capability is close to the function of the single trigger detection point of the previously known system described in the previous paragraph.

One problem that confronts telecommunication systems companies and service providers using such an intelligent network is how to implement these eight specified capabilities. A related problem is how to implement these eight specified capabilities as part of the intelligent network of a telecommunication system in order to expedite calling operations. Further, it is desirable that these eight specified capabilities have multiple trigger factors that may readily be controlled and observed by a system operator to provide a flexible and intelligent network.

SUMMARY OF THE INVENTION

Briefly stated, in accordance with one aspect of the invention, the aforementioned problems are solved and a technical advance achieved by providing a method for setting a binary function trigger detection point using a video display terminal connected to a service switching point, this method having the steps of: selecting an access type from a set of POTS, ISDN, TGRP, PBX, IPBX, and EXCH types; selecting access identification number from a group of numbers in which number 0 is selected if EXCH is the selected type; selecting a bearer service group from a group including NULL, 3P1, 64KBU, SPCH, BCHPS, 7KHZ services; selecting a trigger detection point number from one to eighteen, and selecting a TT INDEX from 1 to 65535. In addition to these steps is the step of selecting a trigger detection point type as either a request type or a notification type; and logically combining the following criteria: RECEIVED DIGITS, CALLING PARTY NUMBER, CLASS OF SERVICE, CAUSE, NATURE OF ADDRESS INTL, and BEARER CAPABILITY according to the selected type.

In accordance with a specific embodiment of the invention, the aforementioned problems are solved by providing a communication system of the intelligent network type having a service switching point, a service control point and means for providing at least one ETSI trigger detection point and including an apparatus for providing a binary function trigger detection point using a video display terminal connected to a service switching point, having: means for selecting an access type from a set of POTS, ISDN, TGRP, PBX, IPBX, and EXCH types; means for selecting access identification number from a group of numbers in which number 0 is selected if EXCH is the selected type; means for selecting a bearer service group from a group including NULL, 3P1, 64KBU, SPCH, BCHPS, 7KHZ services; means for selecting a trigger detection point number from one to eighteen, means for selecting a TT INDEX from 1 to 65535; means for selecting a trigger detection point type as either a request type or a notification type; and means for logically combining the following criteria: RECEIVED DIGITS, CALLING PARTY NUMBER, CLASS OF SERVICE, CAUSE, NATURE OF ADDRESS INTERNATIONAL, and BEARER CAPABILITY. The apparatus also has means for firing said trigger detection point if the logical combination of said criteria according to the binary function is true; and means responsive to a firing of said firing means for transmitting a query to an SCP for instructions on what action to take next. The binary function may be a conditional NOT, a conditional AND, a conditional OR function or other binary function.

BRIEF DESCRIPTION OF THE DRAWING

FIG. 2 is a table showing basic call state model detection point types.

FIG. 3 represents a detection point processing decision table.

FIGS. 8A and 8B illustrate an interactive screen display for selecting unconditional trigger detection point data and related database record for a trunk group.

FIGS. 9A and 9B illustrate an interactive screen display for selecting unconditional trigger detection point data and related database record for a PBX.

FIGS. 10A and 10B illustrate an interactive screen display for selecting unconditional trigger detection point data and related database record for an ISDN PBX.

FIGS. 11A and 11B illustrate an interactive screen display for selecting conditional AND trigger detection point data and related database record.

FIGS. 12A and 12B illustrate an interactive screen display for selecting conditional AND trigger detection point data for a single criteria and related database record.

FIGS. 13A and 13B illustrate an interactive screen display for selecting conditional OR trigger detection point data and related database record.

FIGS. 14A and 14B illustrate an interactive screen display for selecting conditional NOT trigger detection point data and related database record.

FIGS. 15A and 15B illustrate an interactive screen display for selecting INAP trigger detection point data and related database record.

FIGS. 16A and 16B illustrate an interactive screen display for selecting intelligent network trigger detection point data and related database record.

GLOSSARY

Figure 1:
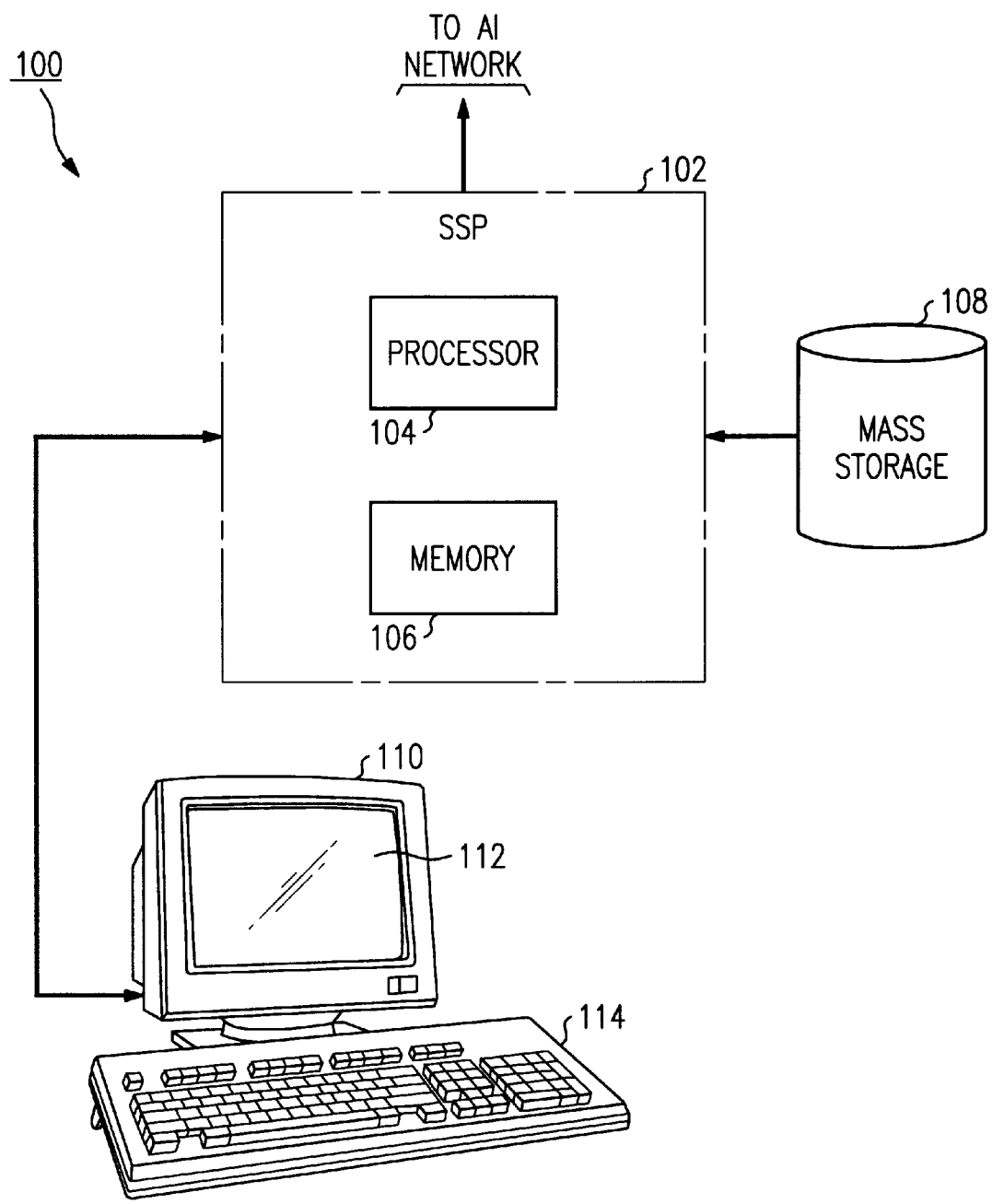
FIG. 1 is a simplified block diagram of a Service Switching Point and peripherals connected to an intelligent network

To aid understanding of the Specification, this glossary of terms used is hereby presented. Many of these terms are well know in the art. For those that are not well know, this glossary may be helpful.

5EE8—Eighth Export Developed 5ESS Generic (Trademark of Lucent Technologies)
5ESS—#5 Electronic Switching System (Trademark of Lucent Technologies)
ACG—Automatic Call/Code Gapping
ACM—Address Complete
ADC—Announcement and Digit Collection
ADOB—Alternate Destination on Busy
AFP—Advanced Freephone
AM—Administrative Module
ANN—Announcement
ANST—Answer Timer
BFP—Basic FreePhone
BRA—Basic Rate Access
BCSM—Basic Call State Model
CC—Call Coordinator/Calling Card
CCF—Call Control Function
CD—Customer Delivery
CFL—Call Failure
CIC—Call Incompletion Code
CID—Customer ID
CLI—Calling Line Identification
CP—Call Prompter
CS-1—Capability Set 1
CSD—Customer Specification Document
DCDB—Digit Collection Data Block
DCIS6—CCS6 Direct Signalling
DP—Detection Point
DPDB—Dual Parenting Data Block
DS—Design Specification
DSS—Document Support System
EDP—Event Detection Point
EDP_R—Event Detection Point_Request
EDP_N—Event Detection Point_Notification
EES—Execution Environment System
ETSI—European Telecommunications Standards Institute
FC—Feature Control
FSD—Feature Specification Document
GTT—Global Title Translation
HLD—High Level Design
IBS—In-Band Signaling
IE—Information element within a Q.931 message
IMR—Initial Modification Request
IN—Intelligent Network
INAP—Intelligent Network Application Protocol
IP—Intelligent Peripheral
ISDN—Integrated Services Digital Network
ISENEAR/ENEAR—ETSI ISDN Near Model
ITU—International Telecommunications Union (previously CCITT)
LLD—Low Level Design
MCCOWINQRY—IN query state
MCG—Manual Call/Code Gapping
NCP—Network Control Point
NCPE—Network Control Point Emulator
NGIN—Next Generation Intelligent Network
NLlt—Netherlands Local Toll
NM—Network Management
NPC—Next Generation Intelligent Network Platform Control
O-BCSM—Originating Basic Call State Model (i.e. the OTP)
ODA—Office Data Administration
ODD—Office Dependent Data
OSDS—Operating System For Distributed Switching
OTP—Originating Terminal Process
PBX—Private Branch Exchange
PCBLA—Process Control Block Link Area
PDDC—Post Dialing Digit Collection
PFM—Parent Fex Model
PIC—Point In Call
PPM—Periodic Pulse Metering
PRA—Primary Rate Access
PROS—Product Offerings
Q931—Q.921 Signalling functional area
RC—Recent Change
RTA—Routing And Terminal Allocation Subsystem
SBS—Switch Based Services
SCF—Service Control Function (i.e. the SCP)
SCP—Service Control Point
SF—Service Filtering
SLPI—Service Logic Processing Instance
SM—Switching Module
SMF—Service Management Function (i.e. the IN-SMS)
SPP—Single Process Purge
SS—Signaling System
SSF—Service Switch Function (i.e. the SSP)
SSP—Service Switching Point
T-BCSM—Terminating Basic Call State Model (i.e. the TTP)
TCAP—Transaction Capability Application Protocol
TDP—Trigger Detection Point
TDP_N—Trigger Detection Point_Notification
TDP_R—Trigger Detection Point_Request
TH—Transaction Handler
TM—Terminal Maintenance
TTP—Terminating Terminal Process
UUI—User-to-user Interface
VPN—Virtual Private Network

DETAILED DESCRIPTION

Referring now to FIG. 1, a system 100 for practicing an embodiment of the invention is shown. System 100 has a service switching point (SSP) 102. SSP 102 has a processor 104, and memory 106 to process information and operate according to stored programs. SSP 102 is connected to an AI Network 107 and to a mass storage unit 108 for storing information used by the rest of the AI Network 107. SSP 102 is also connected to display terminal 110. Display terminal 110 has a video display screen 112 for viewing by a user and keyboard 114 for interactive user input. User input selections affect the manner which the TDPs are actuated or "fired".

TDPs can 'fire' at different stages of a telephone call to accomplish different tasks. The TDPs provide necessary information and data to ETSI Intelligent Network Capability Set 1 Intelligent Network Application Protocol Service Switching Point Finite State Machine, U.S. application Ser. No. 09/056,402, which is mentioned previously and is hereby incorporated by reference. This detailed description presents the High Level Design for a SSP Detection Point Processing feature. The basic call and connection events may be visible to IN service instances. Detection Points DPs are the points in call processing at these events are detected. PITU-T and ETSI standards define the following Detection Points:

Detection Points 1–10 apply to the Originating Basic Call State(O-BSCM), i.e. the Originating Terminal Process (OTP 404). Detection Points 12–18 apply to the Terminating Basic Call State(T-BSCM), i.e. the Terminating Terminal Process (TTP not shown). At the time of application, there were two actual uses contemplated of the DP Processing functionality:

A first embodiment requires support of DPs 2, 3, 4, 5, 6, 7, 9 and 10 Trigger Detection Points. DPs 3, 4, 5, 6, 7, 9 and 10 are also required as Event Detection Points. The second embodiment requires support of DP 3 as the only Trigger Detection Point and DPs 3, 4, 5, 6, 7, 9 and 10 are required as Event Detection Points for the second. The DPs required in both embodiments only apply to the O-BCSM (OTP 404). Though no DPs applying to the T-BCSM (TTP) were required by embodiments one and two, the architecture of the present invention supports the addition of BCSM DPs.

According to the Basic Call State Model (BCSM) DPs, there are certain basic call and connection events at the Service Switching Point (SSP 102) that can invoke the IN service logic that resides in the Service Control Point (SCP). DPs are the points in the SSP call processing at which these are detected.

A DP can be armed in order to notify an IN service logic instance that a DP was encountered, and potentially to allow the IN service logic instance to influence subsequent call processing. If a DP is not armed, the SSF/CCF call processing process without SCF involvement. DPs are characterized by the following four attributes:

Arming/disarming mechanism—The mechanism by which the DP is armed. A DP may be statically armed (TDP) or dynamically armed (EDP). A DP is statically armed through service feature provisioning. A statically armed state, Dparmed, is maintained until explicitly disarmed. A DP is dynamically armed by the SCF within the context of a call-associated IN service relationship.

The following DP disarming rules apply: an armed EDP is met, then it is disarmed, an EDP is met that causes the release of the related leg, then all related to that leg are disarmed, a call is released, then all EDPs related to that call are disarmed.

Criteria—In addition to the condition that a DP is armed, other conditions have to be met before the SCF is notified that the DP was encountered. Criteria can be assigned to a DP on a line, trunk group, private, or office basis.

The following is a list of the supported DP criteria, as applicable, a given DP: class of service, cause, nature of address, bearer capability, specific calling party number and received digits. The received digits category encompasses the following criteria: specific digit string, feature code, prefixes, called party number, and specific abbreviated dialing string.

Relationship—Given that an armed DP was encountered and DP criteria met, the SSF may provide an information flow via a relationship: this relationship is between the SSF/CCF and the SCF for the purpose call/service logic processing, it is considered to be an IN relationship. This relationship may be of two types: a control relationship if the SCF is able to influence call processing the relationship; or a monitor relationship if the SCF is not able to influence call processing the relationship.

With respective to an IN service relationship, the information flow provided the SSF to the SCF on encountering a DP may initiate a control relationship, be within the context of an existing control relationship, or may be the context of an existing monitor relationship.

Call processing suspension—Given that an armed DP was encountered DP criteria are met for an IN service relationship, a SSF may have call processing allow the SCF to influence subsequent processing. When this occurs, the SSF sends an information flow to the SCF requesting instructions, and waits for a response. When a call is not suspended, the SSF sends an information flow notifying SCF that a DP was encountered, and does not expect a response. An attribute is set by the same mechanism that arms the DP. On these attributes, four types of DPs are identified in IN CS1. These are shown in FIG. 2, which is a table of BCSM DP types.

In DP Processing, a control relationship persists as long as there is at least EDP-R armed for this portion of the call. A control terminates if there are no more EDPs armed or there are clears. During a control relationship, EDPs may be disarmed by the SCF, or are disarmed by the SSF they are encountered and reported to the SCF, or when there are call clears.

A control relationship changes to a monitor relationship there are no more EDP-Rs armed and at least one N is armed. A monitor relationship terminates if there are no more EDP-Ns armed or the call clears. During monitor relationship, EDP-Ns are disarmed by the SSF they are encountered and reported to the SCF, or when there are call clears.

TDP-N criteria may be processed whether or not there is a control relationship for the same portion the call, since a TDP-N does not open a control relationship. This procedure has no effect on the existing control relationship.

Since a DP may be armed as a TDP and/or an EDP for the same call, SSF supports a number of TDP/EDP processing combinations to a single point of control. combinations are identified in the table shown in FIG. 3, a DP Processing Decision Table, along with error combinations that should not occur:

Design Overview

Figure 4:
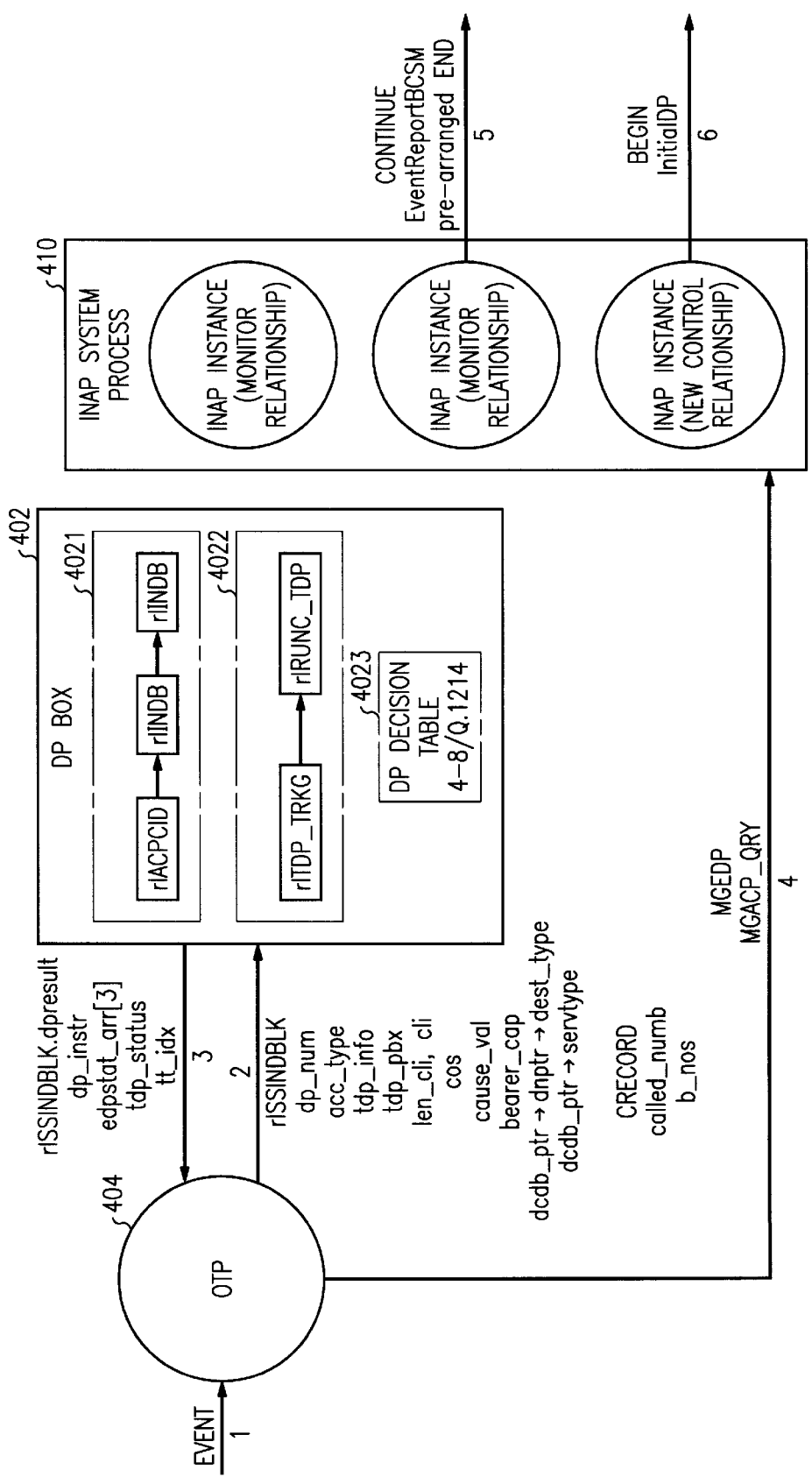
FIG. 4 is a block diagram illustrating portions of the detection point processing shown in FIG. 3.

Referring now to FIG. 4, DP features are implemented by a DP Box 402. The DP Box 402 is a common function that is called by every signaling Basic Call State Model (BCSM), at every supported Detection Point, when the Service Logic Location in rlPCBLA is SSPNULL or SSPETSI (at DP3 Destination Type is also examined).

At this point, only O-BCSMs (OTPs) are being modified/developed to interface with the ETSI DP Box 402. T-BCSM (TTP) support of ETSI is contemplated but not presently implemented.

The DP Box 402 performs the following tasks:
  determining if the DP is armed, ensuring single point of control; and instructing the calling BCSM what to do next.

The DP Box 402 achieves the DP armed determination by first examining the dynamic database that holds the EDP information for this call. This EDP database is implemented by one or more rlINDB dynamic relations. These are pointed to by dynamic relation rlACPCID which is the entry point to the EDP database. There will be one rlINDB relation for each dialog (relationship) that is started with the SCP for this call.

The static database (ODD) that holds the TDP information for this call will then be examined. This TDP database is implemented by the static relations rlTDP_POTS, rlTDP_DNCT, rlTDP_TRKG, rlTDP_MAGC, rlTDP_PBX, rlPCON_TDP, rlRCON_TDP, rlPUNC_TDP, rlRUNC_TDP, as well as static global parameters Gltdp1 to Gltdp18 and Gltdp1tbl to Gltdp18tbl.

Since the same DP may be armed as a TDP and/or an EDP to ensure a single point of control, and since the same phone call may initiate more than one dialog (relationship) with the SCP, the DP Box 402 uses DP Processing Decision Table shown in FIG. 3, in order to ensure single point of control. Single point of control indicates that even though there may be more than one concurrent relationship with the SCP for the same call, only one of these relationships can be a control relationship.

The DP Box 402 also is responsible for limiting the number of concurrent relationships with the SCP that can be initiated by the same phone call. This maximum number of concurrent relationships has been identified as 3, of which at most one can be a control relationship.

The DP Box 402 can instruct the BCSM to do one of the following: continue, send a query message to INAP 410 and suspend, send a query message to INAP 410 and continue, send a EDP Report message to INAP 410 and suspend, send a EDP Report message to INAP 410 and continue, send an EDP Report and a query message to INAP 410 and suspend, and send an EDP Report and a query message to INAP 410 and continue.

The following example illustrates how the O-BCSM (OTP 404) and the DP Box 402 collaborate in order to provide Detection Point Processing functionality. In this example, when the OTP 404 reports to the DP Box 402 that a DP was encountered, there are already two monitor relationships with the SCP for this call. One of these is due to the SCP expecting notification of the DP that has just been reported. The other monitor relationship is on a DP other than the one that has just been reported.

Also, lets assume that the TDP database is set up so that the DP that has just been reported is armed unconditionally as a Request.

After examining the EDP database, the TDP database and the DP Decision Table, the DP Box 402 will instruct the OTP 404 to send a Query-Request (which will start a new control relationship) and an EDP Report-Notification (which will close the monitor relationship that was active on this DP.) The other monitor relationship will not be affected, since it is on a DP other than the one being processed.

As shown in FIG. 4, the following four subsections describe four major parts that make up the DP Processing functionality: the Interface between the OTP 404 and the DP Box 402, the EDP Database 4021, the TDP Database 4022 and the DP Decision Table 4023.

The interface between the OTP 404 and the DP Box 402.

When a signaling OTP 404 is created, if the switching office supports ETSI INAP (Gletsiinap=DBYES) then the Service Logic Location will be initialized to SSPNULL in rlPCBLA. If Gletsiinap=DBNO, SERVLOC will be initialized to SSPDCIS6.

At supported DPs other that DP3 (Analyzed Information), it is sufficient for the OTP 404 to check the Service Logic Location in order to determine whether or not the DP Box 402 should be called. The following check should be made: if SERVLOC is SSPNULL or SSPETSI then call SSdpbox (ssindblk_ptr), else continue regular processing. DP3 (Analyzed Info) is a special case. In addition to ETSI INAP, "traditional" IN applications such as DCIS6 and SBS can also be invoked at DP3 (in fact, DP3 is the only DP supported by these applications). More specifically, the "traditional" IN applications are invoked if the Destination Type result from Digit Analysis is FREEPHONE, ECONOMY, ACPAST or IODCFREE.

In order to distinguish between the different IN applications at DP3 (i.e. when digit analysis is complete), the OTP 404 at DP3 decision table is used by the OTP 404:

| OTP at DP3 (Analyzed Info) | | | |
|---|---|---|---|
| SERVLOC | DESTTYPE | OTP Action | Comment |
| SSPNULL | FREEPHONE* | Make traditional IN call | Bimodal office** |
| SSPETSI | FREEPHONE | Fire craft assert | Bimodal office - ODD is wrong |
| SSPDCIS6 | FREEPHONE | Make standard IN call | Standard IN office doesn't support ETSI |
| SSPNULL | NOT FREEPHONE | Call ETSI DP Box | Potential ETSI call |
| SSPETSI | NOT FREEPHONE | Call ETSI DP Box | Already an ETSI call |
| SSPDCIS6 | NOT FREEPHONE | Cont. regular processing | Non-IN call |

*FREEPHONE includes the following destination types: FREEPHONE, ECONOMY, ASSIST, IODCFREE.
**Bimodal office is defined as an office that supports both ETSI and at least one of the Traditional IN types (Existing INAP, SBS, DCIS6.)

The line feed input from the calling OTP 404 to the DP Box 402 is a set of fields that the OTP 404 populates in dynamic relation rlSSINDBLK (IN Data Block which is attached to every call's rlPCBLA), as well as fields that the OTP 404 populates in the Call Record. The DP Box 402 will use these fields in order to determine whether this DP is armed. The following fields are considered to be data inputs from the calling OTP 404 to the DP Box 402:

The Detection Point number.

This is the rlSSINDBLK.dp_num field. The OTP 404 will populate this field according to what DP it is reporting to the DP Box 402.

The Call Record ID.

This is a unique number identifying this call and is used by the DP Box 402 as a key to dynamic relation rlACPCID. This dynamic relation represents the entry point into the EDP database 4021. The DP Box 402 will obtain the value of the Call Record ID for each call by using macro FCGETCID().

The Access Type

This is the rlSSINDBLK.acc_type R field. This field will be populated so that each OTP will identify itself to the DP Box 402. Its values are "POTS line", "ISDN line", "Trunk group", "POTS line belonging to a PBX", "ISDN line belonging to a PBX" and "Trunk group belonging to a PBX (strunk)."

Note that "POTS line belonging to a PBX" and "ISDN line belonging to a PBX" refer to lines that are directly attached to the SSP 102. These lines are assigned to Multi-Line Hunt Groups that belong to logical PBXs defined in the SSP 102. On the other hand, "Trunk group belonging to a PBX" refers to trunks (strunks) that connect the SSP 102 to an external physical PBX.

The DP Box 402 uses the Access Type in order to determine the precedence with which to examine the TDP static database, since there can be three levels of arming:

Individual arming (i.e. on a line or trunk group basis) which takes precedence over Group arming (i.e. on a PBX basis) which takes precedence over Exchange arming.

For example, if the OTP identifies itself as "POTS line belonging to a PBX", the DP Box will first check if the DP has been turned off or is not available for this exchange (global parameter Gltdp[dp_num]=OFF). If Gltdp[dp_num] is not OFF, the DP Box will check if there is TDP data defined on an Individual basis for this line (i.e. whether there is a tuple in rlTDP_POTS for this line). If there is none, the DP Box will then check if there is TDP data defined on a Group basis, i.e. on the logical PBX that the POTS line belongs to (i.e. whether there is a tuple in rlTDP_PBX for the PBX that the line belongs to). If there is none again, the DP Box will check if there is TDP data defined on an Exchange basis (i.e. whether the global parameter Gltdp[dp_num] is set to AND, OR, or NOT). If there is none again (i.e. Gltdp[dp_num]=NOTARMED), the DP Box will conclude that the DP is not armed.

It is important to note that if a TDP is armed conditionally but the DP Box 402 finds that the conditions are not met, the DP Box 402 returns "not armed" and does not continue to check the next level of arming. In the example above, if rlTDP_POTS indicates that the DP is armed conditionally on an Individual (line) basis, but the DP Box 402 determines that the conditions are not met, the DP Box 402 then concludes its examination of the TDP database and returns "not armed".The DP Box 402 does not go on to check if there is arming on a PBX basis or Exchange basis in such a case. Only when there is no TDP data defined at all in a particular level of arming does the DP Box proceed to check the next level of arming.

Another example: If the OTP identifies itself as "Trunk Group", the DP Box first checks if the DP has been turned off or is not available for this exchange (global parameter Gltdp[dp_num]=OFF). If Gltdp[dp_num] is not OFF, the DP Box 402 checks if there is TDP data defined on an individual basis for this trunk group (i.e. whether there is a tuple in rlTDP_TRKG for this trunk group). If there is none, the DP Box 402 checks if there is TDP data defined on an Exchange basis (i.e. whether the global parameter Gltdp[dp_num] is set to AND, OR, or NOT). Note that in this example, the DP Box 402 does not have to check for TDP data on a Group (PBX) basis, since the trunk group has already identified itself as not belonging to a PBX.

The TDP Information associated with the OTP

This is the rlSSINDBLK.tdp_info field. Since an OTP can be either a POTS line, an ISDN line or a Trunk Group (either belonging or not belonging to a PBX) this field will be a union of structures, called tdp_info.

If the OTP is a POTS line, it populates structure rlSSINDBLK.tdp_info.tdp_pots with the values of 'port' and 'party' (these values are known to the OTP since they are the keys to relation rlFC_LINE.). The DP Box 402 uses these values, together with the DP number, as the keys to relation rlTDP_POTS which is the entry point to the TDP database for POTS lines. In addition, the POTS line OTP populates the 'pdp_flag' field in structure tdp_pots. This field indicates whether at least one TDP is armed for this POTS line, and its value also comes from rlFC_LINE.

Similarly, if the OTP is an ISDN line it populates rlSSINDBLK.tdp_info.tdp_dnct with the appropriate values. Further, if the OTP is a trunk group, it populates rlSSINDBLK.tdp_info.tdp_trkg data locations.

The PBX TDP Information if the OTP belongs to a PBX

This is the rlSSINDBLK.tdp_pbx field. If the OTP is assigned to a PBX, it also populates this field, in addition to the appropriate tdp_info structure mentioned before.

If the OTP is a POTS line assigned to a logical PBX or a Trunk Group assigned to a physical PBX, it populates fields 'pbx_id' and 'ppbx_flag' of rlSSINDBLK.tdp_pbx (the OTP can be take these values from rlFC_PBX). The DP Box 402 uses the 'pbx_id', together with the DP number, as the keys to relation rlTDP_PBX which is the entry point to the TDP database for POTS lines assigned to logical PBXs and Trunk Groups assigned to physical PBXs.

If the OTP is an ISDN line assigned to a logical PBX, it populates fields 'pbx_id', 'call_type' and 'magct_flag' of rlSSINDBLK.tdp_pbx (the values can be taken from rlFC_MAGCT.) The DP Box 402 uses the 'pbx_id', the 'call_type' together with the DP number as the keys to relation rlTDP_MAGC which is the entry point to the TDP database for ISDN lines assigned to logical PBXs.

The values of the conditional TDP criteria

Every OTP populates fields "CLI" (rlSSINDBLK.len_cli and rlSSINDBLK.cli), "Bearer Capability" (rlSSINDBLK.bearer_cap),"Class of Service" (rlSSINDBLK.cos) and "Cause Value" (rlSSINDBLK.cause_val) with the dynamic values associated with this call that are known at this Detection Point. In addition, every OTP populates fields "Received Digits" (CRECORD.called_numb) and"Called Party Nature of Address" (CRECORD.b_noa) in the Call Record.

The DP Box 402 uses this information in order to make the comparison with the TDP conditional arming data that may be populated by the customer in the ODD.

Some criteria may not be available to the OTP at a specific DP (for example the "Received Digits" are not available at DP1) or they may not be supported by the OTP at all (for example some inband trunks do not support "CLI" at all). In these cases the OTP passes the following values the DP Box:

"Received Digits"=digit length of 0

"CLI"=digit length of 0

"Called Party Nature of Address"='unknown'

"Bearer Capability"='speech'

"Cause Value"='0'

Note that "Class of Service" is always known at every DP by all types of BCSMs.

The Destination Type

This is the rlSSINDBLK.dcdb_ptr->dnptr->dest_type field. This field is populated by the OTP at DP3 and it contains the Destination Type that is the result of digit analysis. As mentioned before, the Destination Type cannot be FREEPHONE, ECONOMY, ASSIST, IODCFREE when the DP Box 402 is called at DP3.

If the value of the Destination Type is not ETSIDP3 (i.e. it is LOCAL, TOLL, etc.), then the DP Box 402 will use the appropriate TDP new relation (rlTDP_POTS etc.) to enter the TDP database. If the value is ETSIDP3 then the DP Box 402 uses the Destination Type, in combination with the Service Type, as keys to rlATT_TT in order to obtain the Trigger Table Index which leads to the Trigger Table. The DP Box 402 marks the tdp_status as Armed R and instructs the OTP to send a Query-Request to INAP 410 (provided of course that there is no existing control relationship for this call.)

Using the Destination Type and Service Type is an alternate way of supporting conditional TDP3 (with 'received_digits' as the only criteria). This is because ODA and RC/Vcan only support a limited number of tuples of the new relations rlPCON_TDP and rlRCON_TDP which are used for conditional arming. It should be noted that if a customer chooses to use Destination Type=ETSIDP3 as their way to arm TDP3, they cannot specify any other DP3-applicable criteria, except 'Received Digits'.

The Service Type

This is the rlSSINDBLK.dcdb_ptr->servtype field. This field will be used in combination with the Destination Type to provide an alternate way of arming TDP3, as explained above.

Output to the calling OTP

Structure rlSSINDBLK.dpresult is the output of the DP Box 402 back to the calling OTP 404. The value of its fields will instruct the calling OTP 404 on what to do next and how to populate certain parts of the messages that the OTP 404 will use in its communication with INAP 410.

Structure rlSSINDBLK.dpresult contains the following information:

The Instruction from the DP Box to the calling OTP—'dp_instr' is the main field in the dpresult structure. It is an explicit instruction from the DP Box 402 to the OTP 404 on what to do next. Its values include "send a Query to INAP 410 and suspend", "send a Query to INAP 410 and continue", "send an EDP Report to INAP 410 and suspend."

The EDP status—This is an array of three structures (of type DMEDPSTAT) that contain the EDP status information (Armed-R, Armed-N, Notarmed) for up to three SSP<->SCP relationships. It is populated by the DP Box 402, after it examined the EDP dynamic database. The OTP uses this array of structures in order to populate the MGEDP.edp_status field (assuming the DP Box 402 has instructed the OTP to send an EDP Report to INAP.)

The TDP status—This field ('tdp_status') contains the TDP status information (Armed-R, Armed-N, Notarmed) for this DP. It is populated by the DP Box, after it examined the TDP static database. The OTP uses this field in order to populate the MGACP_QRY.tdp_status field (assuming the DP Box has instructed the OTP to send a Query message to INAP).

The Trigger Table Index—This field ('tt_idx') is the key to the IN Trigger Table which is read by the OTP when the DP Box has instructed the OTP to send a Query message to INAP.

The EDP database

The EDP database is the dynamic database that is populated on a per call basis, when the SCP requests from the SSP to arm Detection Points as Event Detection Points. The EDP database is set up and maintained by INAP at the SSP. Relation rlACPCID (keyed by the 'cr_id') is the entry point to the EDP database and it points to as many rlINDB tuples as there are active SSP<->SCP relationships for this call (field rlACPCID.conv_id actually contains the count—note that his number can be from 0 to 3 at any given time).

Each rlINDB tuple contains the arming status (Armed-R, Armed-N, Notarmed) for each Detection Point in the relationship it represents, as well as the type of relationship (control or monitor).

Figure 5:
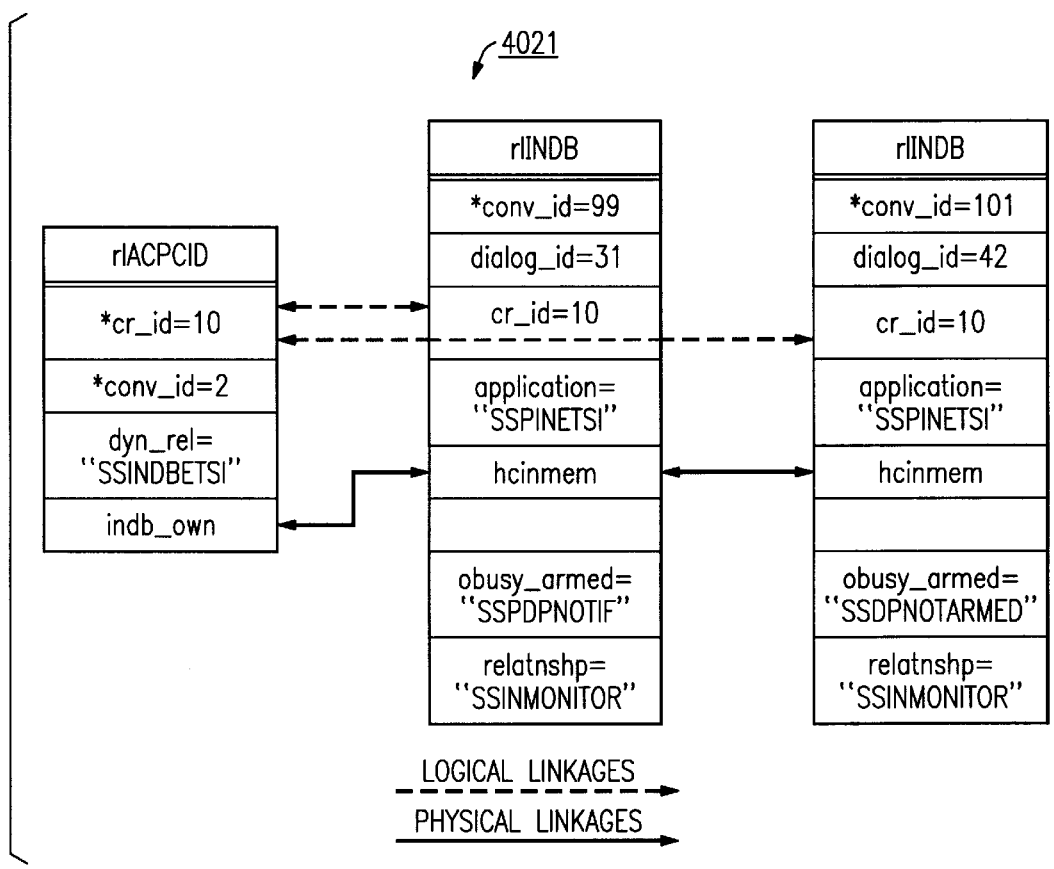
FIG. 5 is a block diagram illustrating the dynamically armed detection point database.

In the example shown in FIG. 5, when DP4 is reported by the OTP, there are already two monitor relationships with the SCP for this call. One of these is due to the SCP expecting notification of DP4 (conv_id=99). The other monitor relationship (conv_id=101) has a DP armed other than DP4.

The DP Box 402 reads the EDP database for this call and populates the first two (out of a possible three) structures in the rlSSINDBLK.dpresult.edpstat_arr array. As shown in FIG. 5, the DP Box 402 populates dpresult.edpstat_arr as follows:

edpstat_arr[0].conv_id=99;
    edpstat_arr[0].edp_status=SSDPNOTIF;
    edpstat_arr[0].scp_relatnshp=SSINMONITOR;
    edpstat_arr[1].conv_id=101;
    edpstat_arr[1].edp_status=SSDPNOTARMED;
    edpstat_arr[1].scp_relatnshp=SSINMONITOR;
    edpstat_arr[2].conv_id=0,
    edpstat_arr[2].edp_status=SSDPNOTARMED; and
    edpstat_arr[2].scp_relatnshp=SSINNONE The TDP database The TDP database is the static database (ODD) that is populated by the customer in order to arm Detection Points as Trigger Detection Points. It correlates the access type (POTS line, Trunk Group, etc.) that is being provisioned with the type of arming required (unconditional or conditional) at a particular DP.

There will be five new relations: rlTDP_POTS, rlTDP_DNCT, rlTDP_TRKG, rlTDP_PBX and rlTDP_MAGC. Relations rlTDP_POTS and rlTDP_DNCT will be SM partitioned since the main relations (rlFC_LINE and rlFC_DN respectively) of the access types they represent are SM partitioned. Relations rlTDP_TRKG, rlTDP_PBX and rlTDP_MAGC is SM redundant since the main relations (rlSM_TRKG, rlFC_PBX and rlFC_MAGCT) of the access types they represent are SM redundant.

In order to provision a POTS line, relation rlTDP_POTS is used. This new relation has the same keys as rlFC_LINE ('port' and 'party'), as well as the TDP number ('tdp'). This relation is SM partitioned and it points to either rlPUNC_TDP (if unconditional arming is required for this line at this DP) or rlPCON_TDP (if conditional arming is required.)

Similarly an ISDN line uses relation rlTDP_DNCT which has the same keys as rlFC_DNCT ('ltm_idx', 'ltm_type' and 'call_type') as well as the TDP number. rlTDP_DNCT is also SM partitioned and points to either rlPUNC_TDP or rlPCON_TDP.

A trunk group uses relation RlTDP_TRKG which has the same keys as as rlSM_TRKG ('tgroup'), as well as the TDP number. The relation is SM redundant and points to either rlRUNC_TDP (if unconditional arming is required for this line at this DP) or rlRCON_TDP (if conditional arming is required).

If a user wishes to populate the TDP data on a POTS PBX or Strunk PBX basis, relation rlTDP_PBX will be used. rlTDP_PBX has the same keys as rlFC_PBX ('pbx_id'), as well as the TDP number. rlTDP_PBX is SM redundant and points to either rlRUNC_TDP or rlRCON_TDP.

If the user wishes to populate the TDP data on an ISDN PBX basis, relation rlTDP_MAGC is used. Relation rlTDP_MAGC has the same keys as rlFC_MAGC ('pbx_id' and 'call_type'), as well as the TDP number. Relation rlTDP_MAGC is SM redundant and points to either rlRUNC_TDP or rlRCON_TDP.

If the user wishes to populate the TDP data on an Exchange basis, (SM redundant) global parameters Gltdp1 to Gltdp18 and Gltdp1tbl to Gltdp18tbl is used. Since arming on an Exchange basis can only be conditional, the global parameters Gltdp1tbl to Gltdp18tbl points to rlRCON_TDP.

Note that rlPUNC_TDP is a mirror image of rlRUNC_TDP (i.e. the fields are the same). The same is true for rlPCON_TDP and rlRCON_TDP. The difference is that rlPUNC_TDP and rlPCON_TDP is used by the SM partitioned relations (rlTDP_POTS and rlTDP_DNCT), while rlRUNC_TDP and rlRCON_TDP is used by the SM redundant relations (rlTDP_TRKG and rlTDP_PBX), as well as the global parameters Gltdp1tbl to Gltdp18tbl.

Within the rlPCON_TDP and rlRCON_TDP relations (used for conditional arming), the customer can specify a logical expression using either the AND, OR, or NOT operators. Note that this scheme does not support mixing of logical operators in the same conditional expression.

The output of the TDP database is the Trigger Table Index and the TOP status (Armed-Request, Armed-Notification, Notarmed). The Trigger Table Index is used as the key to the IN Trigger Table (view DAITT, rlIN_TT). Note that this feature will move the keys of the existing IN Trigger Table to a new view/relation. The existing Trigger Table will be modified to have the Trigger Table Index as its only key. The ETSI Service Key will added as one of the Trigger Table outputs.

TDP relations used for POTS and ISDN lines (SM partitioned)

Figure 6:
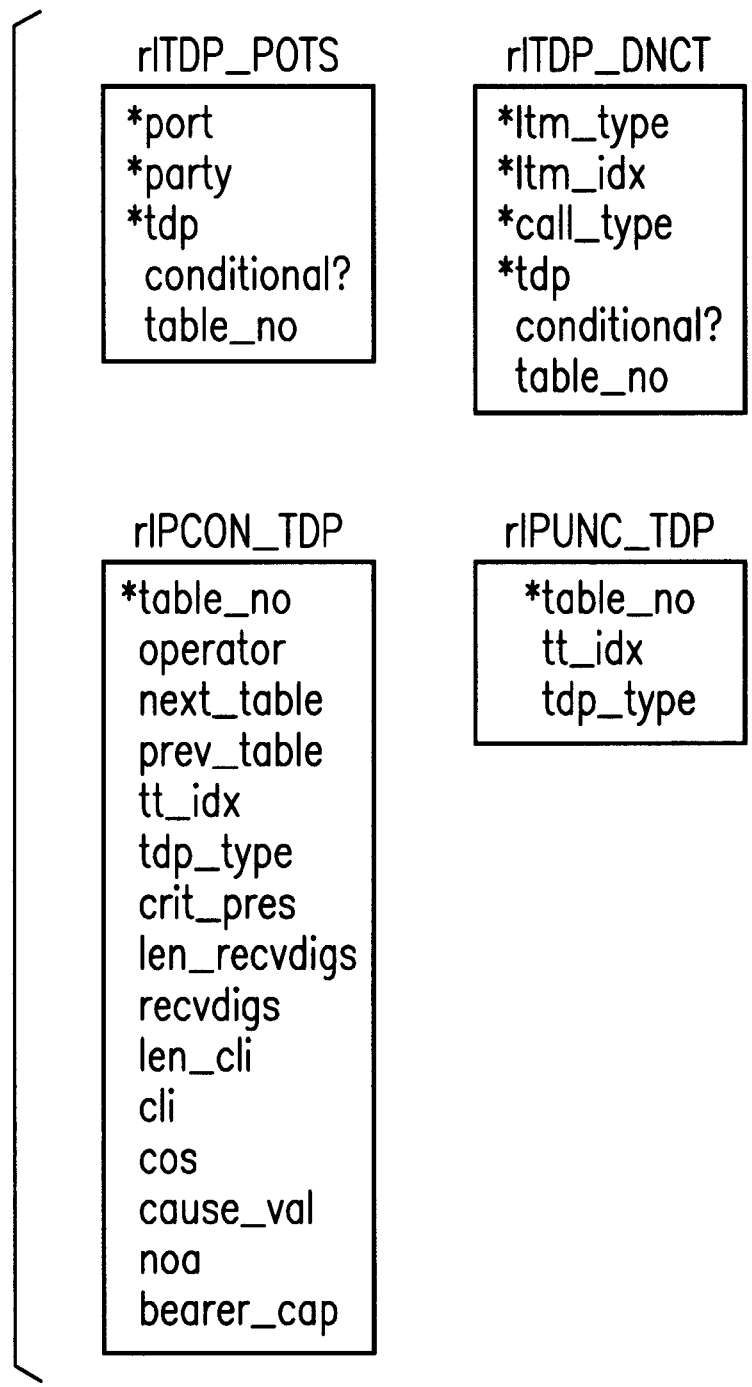
FIG. 6 is a diagram illustrating plain old telephone service (POTS) trigger detection point database records.

FIG. 6 shows the SM partitioned relations used for the POTS line and ISDN line types of access (rlTDP_POTS and rlTDP_DNCT respectively), together with the SM partitioned relations they use in order to arm the TDPs (rlPUNC_TDP and rlPCON_TDP.)

If field 'conditional' is DBYES then rlTDP_POTS/rlTDP_DNCT points to rlPCON_TDP. If field 'conditional' is DBNO then rlTDP_POTS/rlTDP_DNCT points to rlPUNC_TDP.

TDP relations used for Trunk Groups, PBXs and Exchange (SM redundant)

Figure 7:
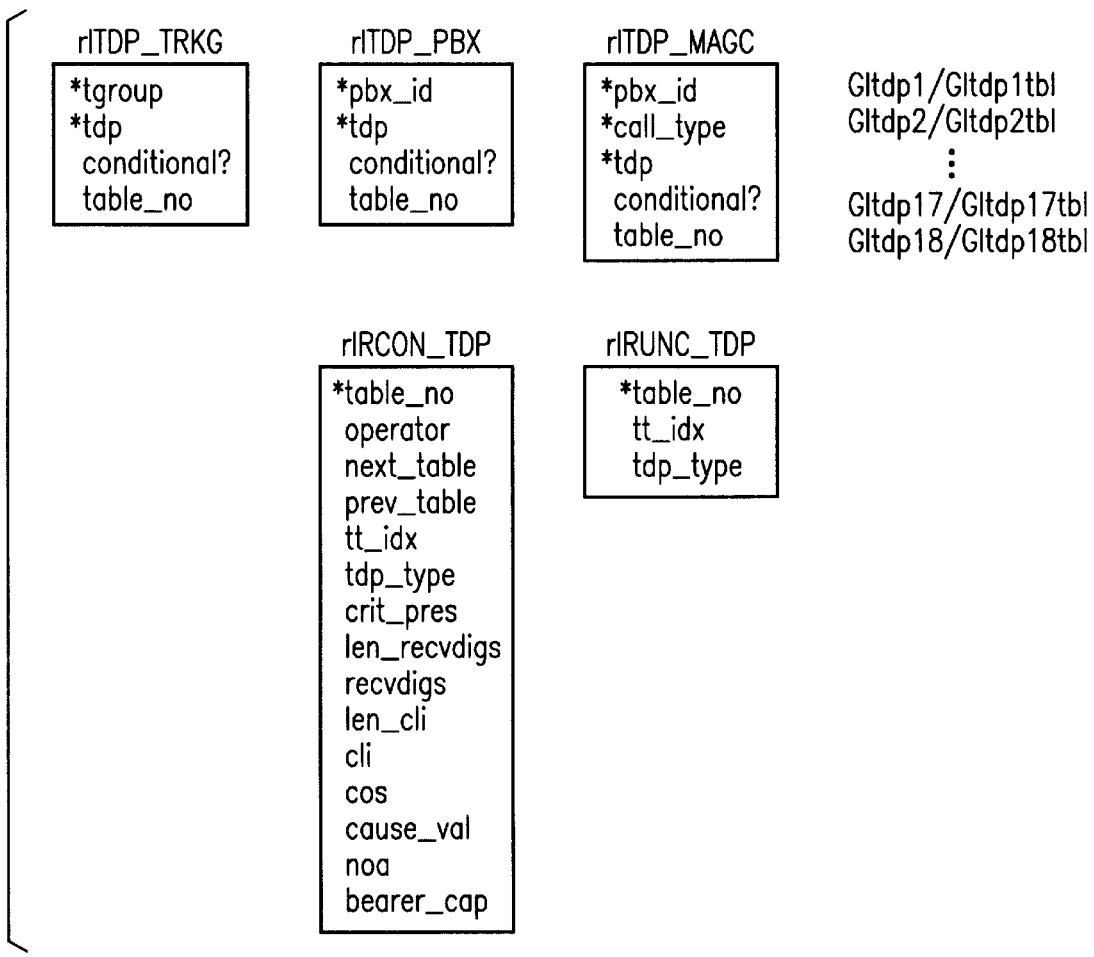
FIG. 7 is a diagram illustrating private branch exchange (PBX) trigger detection point database records.

FIG. 7 shows the SM redundant relations used for the Trunk Group and PBX types of access (rlTDP_TRKG and rlTDP_PBX respectively), as well as the (redundant) global parameters used for the Exchange type of access, together with the SM redundant relations they use in order to arm the TDPs (rlPUNC_TDP and rlPCON_TDP.)

If field 'conditional' is DBYES then rlTDP_TRKG/rlTDP_PBX/rlTDP_MAGC point to rlPCON_TDP. Field 'conditional' is DBNO then rlTDP_TRKG/rlTDP_PBX/rlTDP_MAGC points to rlPUNC_TDP.

Since unconditional arming is not allowed on an Exchange basis, Gltdp1tbl to Gltdp18tbl point to rlPCON_TDP.

Examples of TDP arming

FIGS. 8A–16A and 8B–16B are diagrams that show different examples of how to set up the TDP database. The Office Data Administration (ODA) views FIGS. 8A–16A are shown, together with the equivalent base relation representation for each of the views FIGS. 8B–16B, respectively. Note that there will be a one-to-one mapping between the ODA views and RC/V views. ODA and RC/V are responsible for populating the information shown here in the appropriate relations.

In the case of conditional arming, i.e. when rlPCON_TDP and rlRCON_TDP are used, field 'crit_pres' (criteria presence) indicates which criteria are used in the logical expression. The field 'crit_pres' is one octet long. ODA and RC/V are responsible for setting the appropriate bits depending on the criteria populated by the user/customer.

Figure 8B:
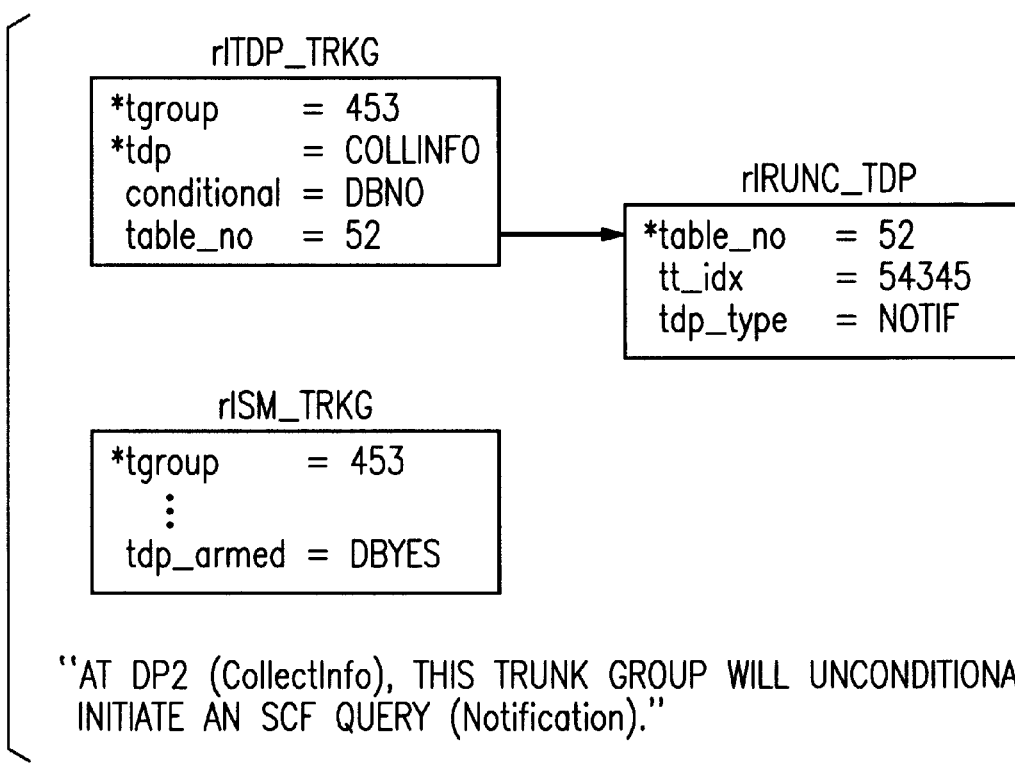
Figure 9B:
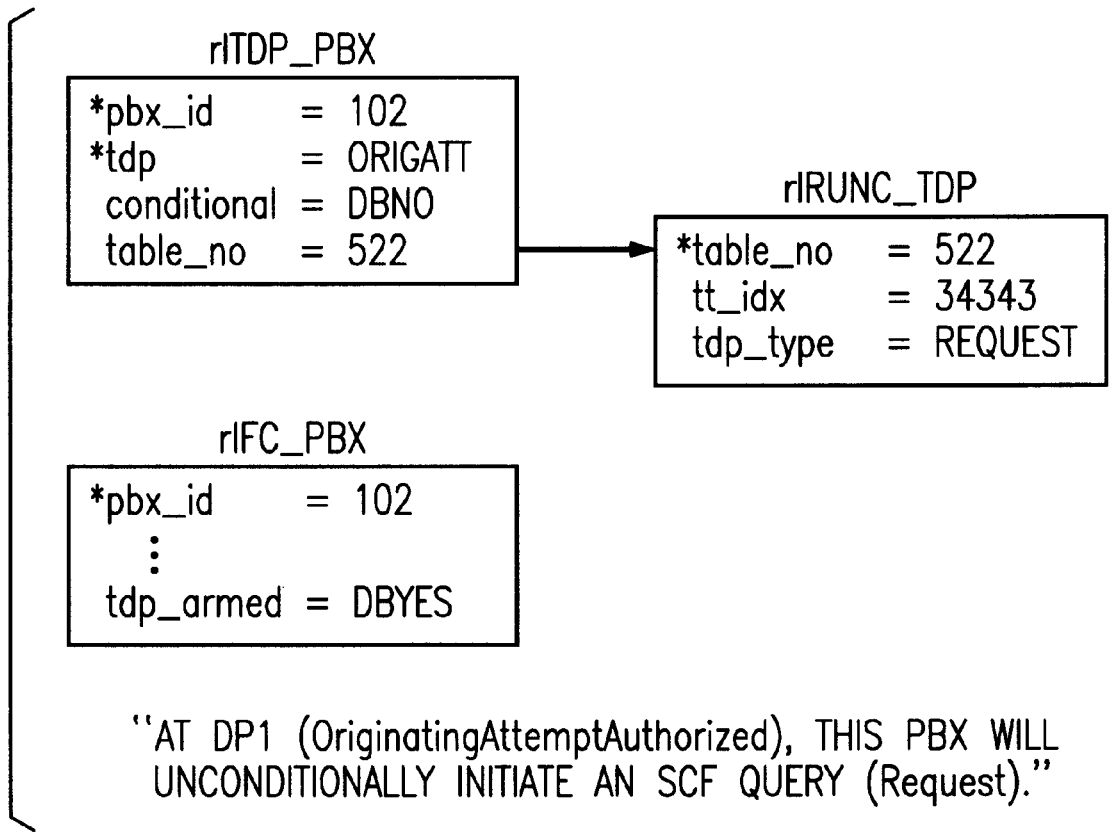
Figure 10B:
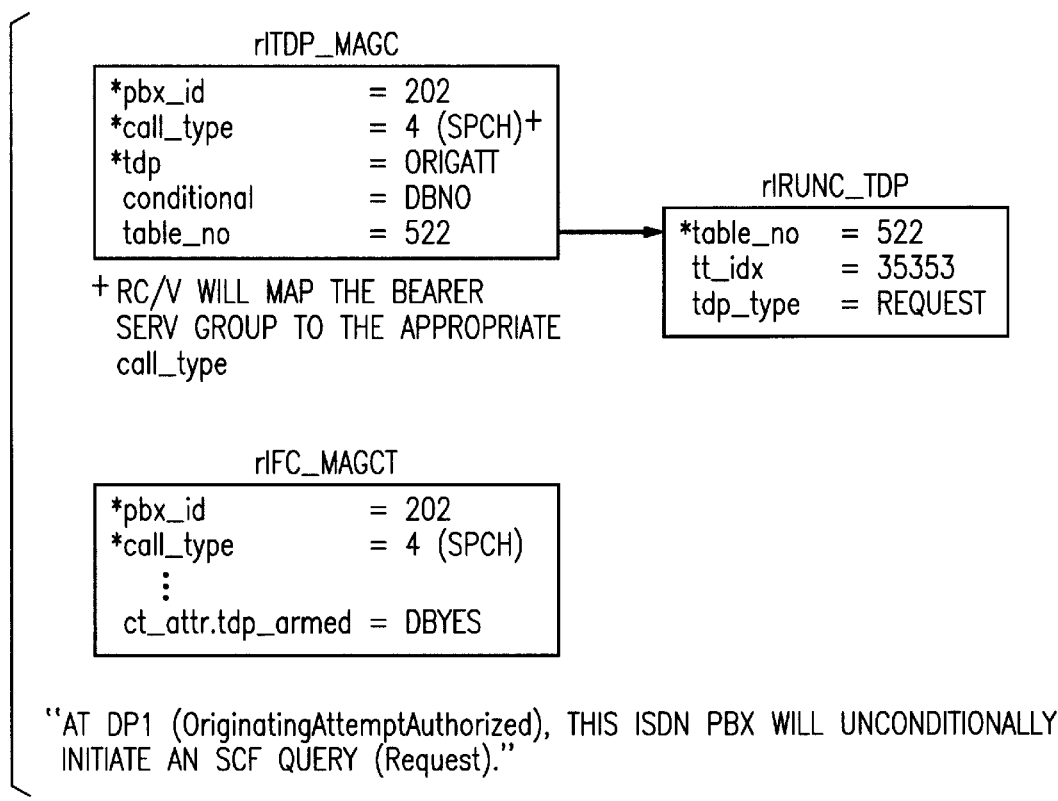
Figure 11B:
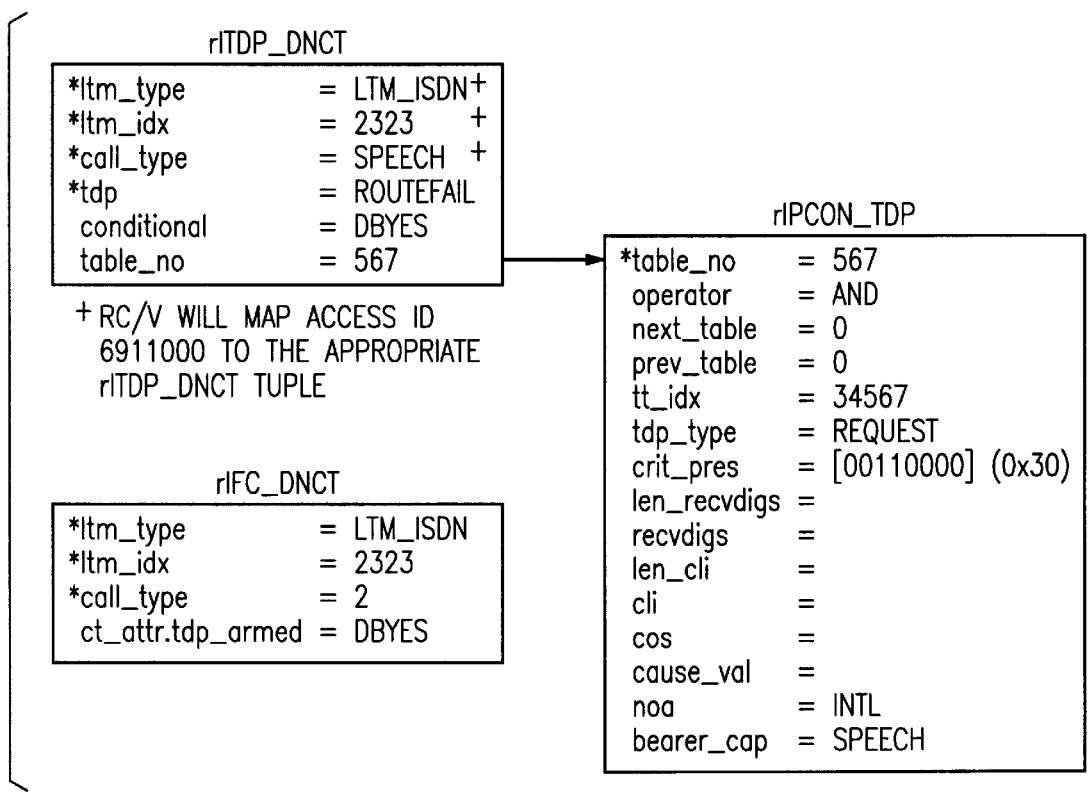
Figure 12B:
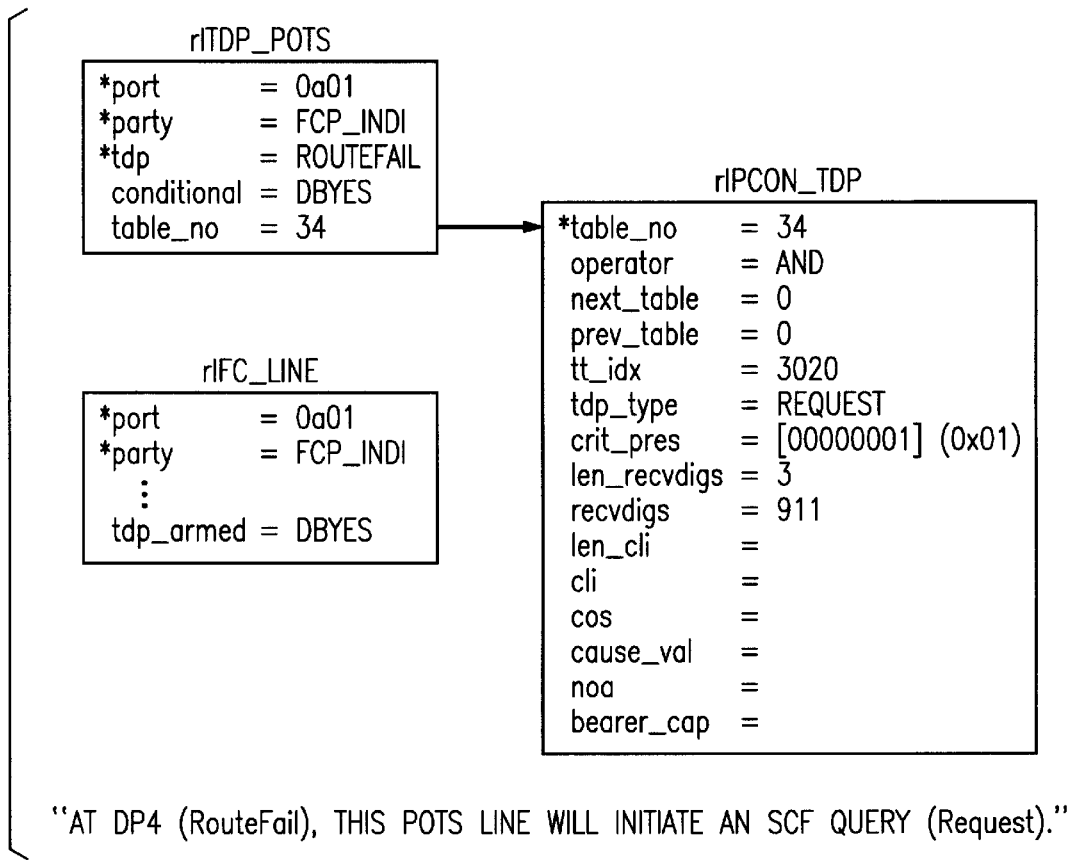
Figure 13B:
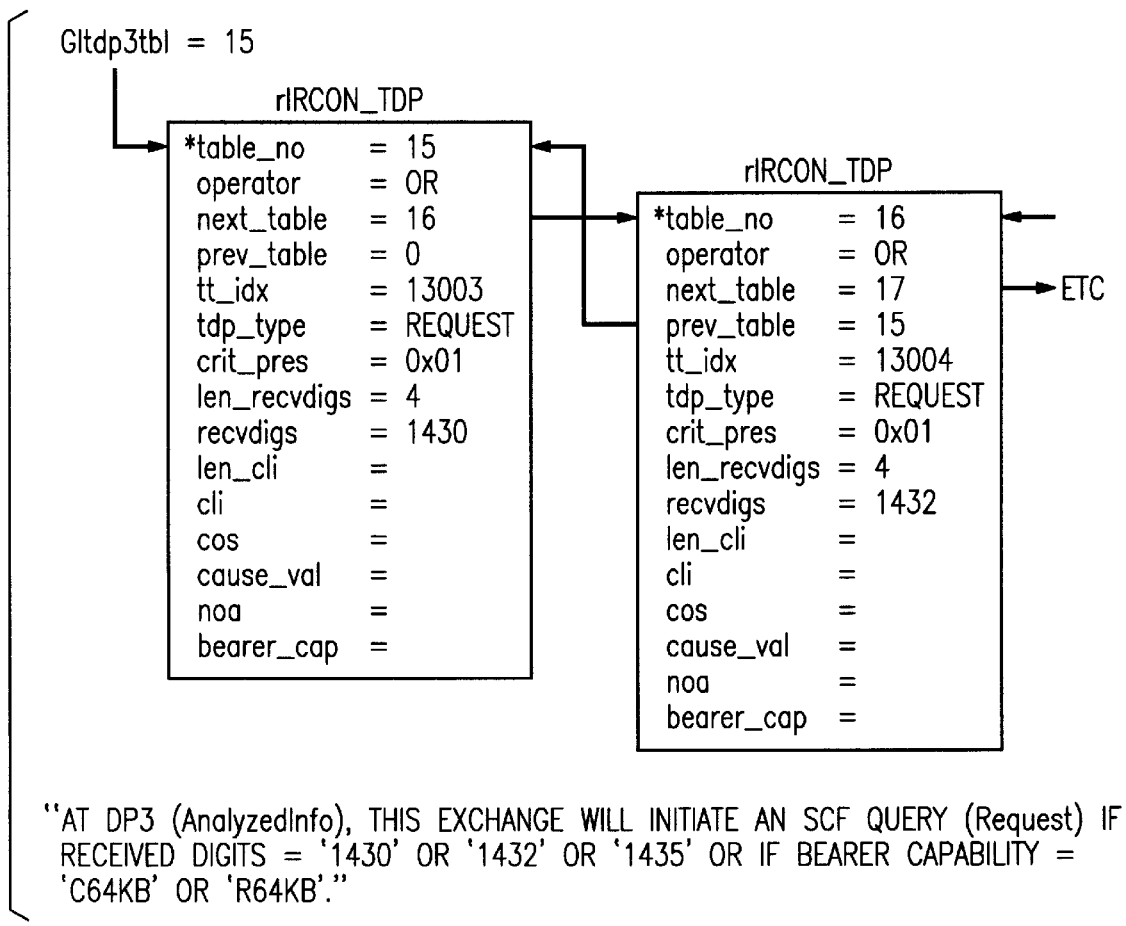
Figure 15B:
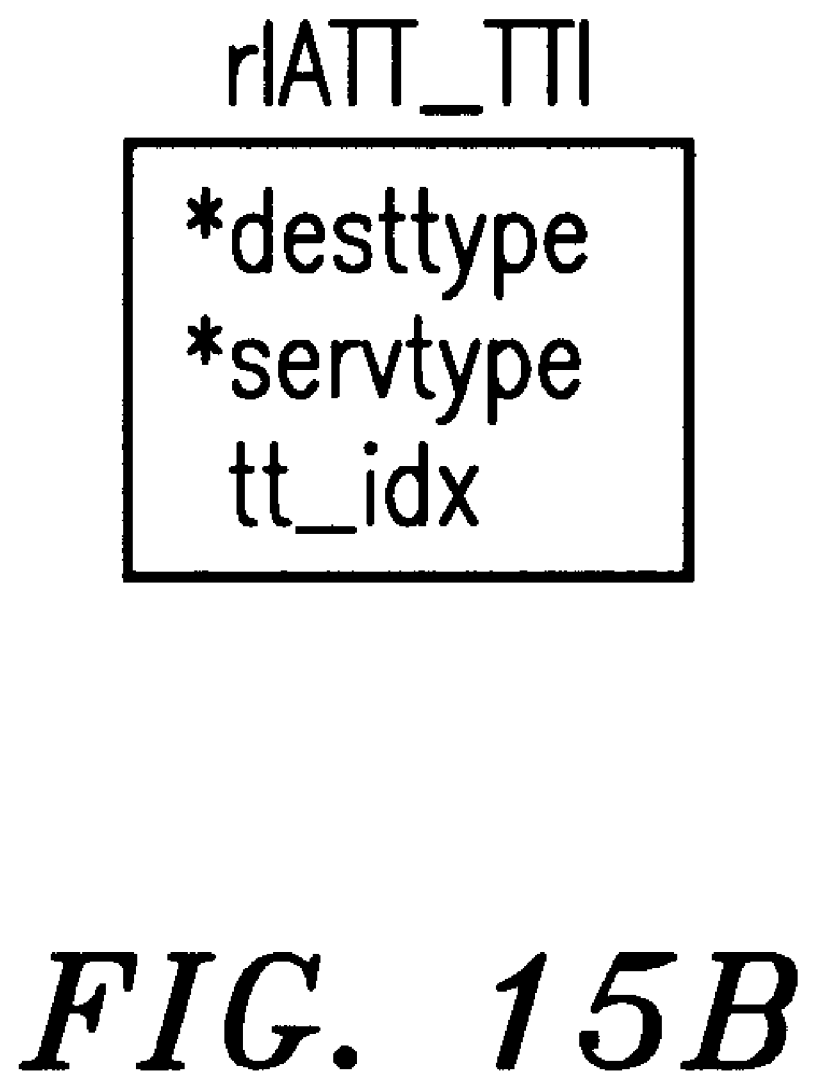

ODA and RC/V also uses population rules to ensure the correct population of the views by the user. For example, there are only certain TDPs that can be armed unconditionally. Similarly, there are certain criteria that can be applied at certain TDPs when conditional arming is employed. Shown in FIGS. 8A–16A and 8B–16B are the following detection point screen displays on display screens such as screen 112 in FIG. 1:

Arming on a trunk group basis: Unconditional TDP is shown in FIGS. 8A and 8B.
Arming on a PBX basis: Unconditional TDP is shown in FIGS. 9A and 9B.
Arming on an ISDN PBX basis: Unconditional TDP is shown in FIGS. 10A and 10B.
Arming on an ISDN line basis: Conditional TDP using a logical AND expression is shown in FIGS. 11A and 11B.
Arming on a POTS line basis: Conditional TDP using a logical AND expression with a single criteria is shown in FIGS. 12A and 12B.
Arming on an Exchange basis: Conditional TDP using a logical OR expression is shown in FIGS. 13A and 13B.
Arming on an Exchange basis: Conditional TDP using a logical NOT expression is shown in FIGS. 14A and 14B.
New Table used to obtain the Trigger Table Index for INAP calls and ETSIDP3 calls is shown in FIGS. 15A and 15B. and
Modified IN Trigger Table is shown in FIGS. 16A and 16B.

The DP Decision Table

As mentioned before, the DP Box 402 is responsible for instructing the OTP 404 on what to do next, every time the OTP 404 reports a DP to the DP Box 402. After the DP Box 402 examines the EDP and TDP databases (4021, 4022), it will use the arming information it obtained as inputs to the DP Decision table 4023. The output of the DP Decision table 4023 is the instruction that the DP Box 402 will return to the OTP 404. Refer to the DP Processing Decision Table shown in FIG. 3 to see all the possible combinations.

Examples

The scenario presented in this section is an example of DP processing. Note that for the sake of simplicity, the column labeled "DP Processing" includes the DP Box 402 functionality, as well as the OTP 404 functionality that are used to populate, send and receive the OSDS messages to and from INAP 410. This OTP functionality is external to the DP Box 402 function and is performed by equipment outside the scope of this application.

Event attempt authorized takes the OTP 404 from PIC1 (O_Null & Authorize_Origination_Attempt) to DP1. At DP1, the OTP 404 reports to the DB box that DP1 was encountered. The DP Box 402 determines that DP1 is not armed and therefore instructs the OTP 404 to continue processing. This instruction takes the OTP 404 to PIC2 (Collect_Information).

When event info collected occurs, the OTP 404 moves to DP2 and reports this DP to the DP Box 402. This time, the DP Box 402 determines that DP2 is armed statically as a Notification (TDP2-N). Note that TDP-Ns are not supported by ETSI INAP but only by ITU-T Q.1214 (ETSI INAP is a subset of ITU-T Q.1214.). The DP Box 402 instructs the OTP 404 to report TDP2-N to INAP 410 by sending an GACP_QRY(N) message, and then continue processing. INAP 410 sends an InitialDP operation in a BEGIN transaction and then sends a Pre-Arranged END to its local TCAP (i.e. INAP 410 instantly opens and closes a dialog with the SCP.)

Since the OTP 404 was instructed to continue processing, it has now moved to PIC3 (Analyze_Information). When event digit analysis complete occurs, the OTP 404 moves to DP3 and reports this to the DP Box 402. The DP Box 402 determines that DP3 is armed statically as a Request (TDP3-R) so instructs the OTP 404 to report this to INAP 410 by sending an MGACP_QRY(R) message. INAP 410 sends an InitialDP operation in a BEGIN transaction to the SCP.

The SCP responds with a Connect and a RequestReportBCSME(EDP5-R) in a CONTINUE transaction. INAP 410 translates the Connect operation to an MGACP_RTE and sends it to the OTP 404, while at the same time it arms EDP5-R by marking the rlINDB dynamic relation. Receipt of MGACP_RTE causes the OTP 404 to move to PIC4 (Routing & Alerting). The OTP 404 routes the call but obtains B-party busy. This event (busy) moves the OTP 404 to DP5, and the OTP 404 reports to the DP Box 402 that DP5 was encountered. The DP Box 402 determines that EDP5-R is armed and it instructs the OTP 404 to report this to INAP 410 in an MGEDP(R) message and suspend. INAP 410 sends an Event Report BCSM(EDP5-R) in a CONTINUE to the SCP.

The SCP responds with another Connect (to another destination number) and a Request Report BCSME(EDP5-N) in a CONTINUE. INAP 410 again translates the Connect operation to an MGACP_RTE and sends it to the OTP 404, while it arms EDP5-N by marking rlINDB. This new MGACP_RTE causes the OTP 404 to move back to PIC4 (Routing & Alerting). The OTP 404 routes the call but obtains B-patty busy again. The busy event moves the OTP 404 to DP5 again, and the OTP 404 reports to the DP Box 402 that DP5 was encountered. The DP Box 402 determines that EDP5-N is armed so it instructs the OTP 404 to report this to INAP 410 in an MGEDP(N) message. INAP 410 sends an Event Report BCSM(EDP5-N) to the SCP and then sends a Pre-Arranged End to its local TCAP to close the dialog. The DP Box 402 also instructs the OTP 404 to continue processing.

The ETSI standards (prETS 300 374-1:1994, Annex C.2.3 "Trigger criteria combinations") state that a particular conditional TDP may require a combination of the applicable criteria to be checked before informing the SCF that the TDP was encountered.

Criteria may be logically combined using: the AND function (e.g. at DP3, initiate an SCF enquiry if "Class of Service"=international call barred AND "Nature of Address"=international); the OR function (e.g. at DP3, initiate an SCF enquiry if "Called Party Number"=831 or "Called Party Number"=836); and the NOT function (e.g. at DP3, initiate an SCF enquiry if "Called Party Number is NOT=831).

The criteria combinations to be checked for a particular TDP is to be specified by means of management procedures applicable for the CCF/SSF.

There was considerable discussion regarding whether these management procedures should allow for combining different logical operators in the same expression. For example, whether expressions like "at DP3, initiate an SCF enquiry if "Called Party Number"=01144 or "Called Party Number"=01130 and "Calling Party Number"=9795970" should be allowed.

Considering that the customer interface to the TDP database is RC/V (which basically allows the customer to fill in tables), it was determined that it will be extremely cumbersome to design an RCN to static data interface which allows this kind of complexity.

In order to allow different operators in a logical expression, an MML-type interface to the static database would be required, so that the use of parentheses (for operator precedence) could be achieved. It was decided that this type of interface would not be provided due to cost and time, and that the traditional RC/V interface would be used to arm TDPs. Present embodiments allow the same logical operator in the same expression.

Assignment of Requirements

As explained before, the DP Box feature provides the common DP Processing functionality necessary for all ETSI BCSMs. The DP Box functionality is also required to collaborate with the calling ETSI BCSM. The implementation of these requirements is the joint responsibility of the DP Box and the calling BCSM. On the DP Box side, all requirements will be implemented by the SSdpbox function.

Thus, it will now be understood that there has been disclosed an ETSI INTELLIGENT NETWORK CAPABILITY SET 1 TRIGGER DETECTION POINTS ON A SERVICE SWITCHING POINT method and apparatus. While the invention has been particularly illustrated and described with reference to preferred embodiments thereof, it will be understood by those skilled in the art, that various changes in form, details, and applications may be made therein. It is accordingly intended that the appended claims shall cover all such changes in form, details and applications which do not depart from the true spirit and scope of the invention.

What is claimed is:

1. A method for setting a conditional NOT trigger detection point using a video display terminal connected to a service switching point, comprising the steps of:

selecting an access type from a set of POTS, ISDN, TGRP, PBX, IPBX, and EXCH types;

selecting access identification number from a group of numbers in which number 0 is selected if EXCH is the selected type;

selecting a bearer service group from a group including NULL, 3P1, 64KBU, SPCH, BCHPS, 7KHZ services;

selecting a trigger detection point number from one to eighteen, selecting a TT INDEX from 1 to 65535;

selecting a trigger detection point type as either a request type or a notification type; and logically combining the following criteria:
   RECEIVED DIGITS,
   CALLING PARTY NUMBER,
   CLASS OF SERVICE,
   CAUSE,
   NATURE OF ADDRESS INTL, and
   BEARER CAPABILITY.

2. The method of claim 1, wherein when sufficient criteria of claim 1 are met, the trigger detection point activates and the service switching point transmits a query to an SCP, and the SCP returns instructions regarding a response for this activated trigger detection point.

3. A method for setting a conditional AND trigger detection point using a video display terminal connected to a service switching point, comprising the steps of:

selecting an access type from a set of types including POTS, ISDN, TGRP, PBX, IPBX, and EXCH types;

selecting an access identification number;

selecting a bearer service group from the set of NULL, 3P1, 64KBU, SPCH, BCHPS, 7KHZ services;

selecting a trigger detection point number from 1 to 18;

selecting a TT INDEX from 1 to 65535;

selecting a trigger detection point type as either a request type or a notification type; and logically combining the following criteria:
   RECEIVED DIGITS,
   CALLING PARTY NUMBER,
   CLASS OF SERVICE,
   CAUSE,
   NATURE OF ADDRESS, and
   BEARER CAPABILITY.

4. The method of claim 3, wherein when sufficient criteria are met, the trigger detection point activates and the service switching point transmits a query to the SCP, and SCP returns instructions what to do for this activated trigger detection point.

5. A method for setting a conditional OR trigger detection point using a video display terminal connected to a service switching point, comprising the steps of:

selecting an access type from a set of POTS, ISDN, TGRP, PBX, IPBX, and EXCH types;

selecting access identification number from a group of numbers in which number 0 is selected if EXCH is the selected type;

selecting a bearer service group from a group including NULL, 3P1, 64KBU, SPCH, BCHPS, 7KHZ services;

selecting a trigger detection point number from one to eighteen, logically OR combining the following criteria:
RECEIVED DIGITS,
CALLING PARTY NUMBER,
CLASS OF SERVICE,
CAUSE,
NATURE OF ADDRESS, and
BEARER CAPABILITY.

6. The method of claim 5, wherein when sufficient criteria are met, the trigger detection point activates and the service switching point transmits a query to the SCP, and SCP returns instructions what to do for this activated trigger detection point.

7. A method of using a conditional NOT trigger detection point using a video display terminal connected to a service switching point, comprising the steps of:

selecting an access type from a set of POTS, ISDN, TGRP, PBX, IPBX, and EXCH types;

selecting access identification number from a group of numbers in which number 0 is selected if EXCH is the selected type;

selecting a bearer service group from a group including NULL, 3P1, 64KBU, SPCH, BCHPS, 7KHZ services;

selecting a trigger detection point number from one to eighteen, selecting a TT INDEX from 1 to 65535;

selecting a trigger detection point type as either a request type or a notification type; and logically combining the following criteria:
RECEIVED DIGITS,
CALLING PARTY NUMBER,
CLASS OF SERVICE,
CAUSE,
NATURE OF ADDRESS, and
BEARER CAPABILITY;

firing said trigger detection point if a logical NOT of said criteria is true; and upon firing said trigger detection point, transmitting a query to an SCP for instructions on what action to take next.

8. A method using a conditional AND trigger detection point using a video display terminal connected to a service switching point, comprising the steps of:

selecting an access type from a set of types including POTS, ISDN, TGRP, PBX, IPBX, and EXCH types;

selecting an access identification number;

selecting a bearer service group from the set of NULL, 3P1, 64KBU, SPCH, BCHPS, 7KHZ services;

selecting a trigger detection point number from 1 to 18;

selecting a TT INDEX from 1 to 65535;

selecting a trigger detection point type as either a request type or a notification type; and logically combining the following criteria:
RECEIVED DIGITS,
CALLING PARTY NUMBER,
CLASS OF SERVICE,
CAUSE,
NATURE OF ADDRESS, and
BEARER CAPABILITY;

firing said trigger detection point if a logical AND of said criteria is true; and upon firing said trigger detection point, transmitting a query to an SCP for instructions on what action to take next.

9. A method for using a conditional OR trigger detection point using a video display terminal connected to a service switching point, comprising the steps of:

selecting an access type from a set of POTS, ISDN, TGRP, PBX, IPBX, and EXCH types;

selecting access identification number from a group of numbers in which number 0 is selected if EXCH is the selected type;

selecting a bearer service group from a group including NULL, 3P1, 64KBU, SPCH, BCHPS, 7KHZ services;

selecting a trigger detection point number ((WHY?)) from one to eighteen, logically OR combining the following criteria:
RECEIVED DIGITS,
CALLING PARTY NUMBER,
CLASS OF SERVICE,
CAUSE,
NATURE OF ADDRESS, and
BEARER CAPABILITY;

firing said trigger detection point if a logical OR of said criteria is true; and upon firing said trigger detection point, transmitting a query to an SCP for instructions on what action to take next.

10. An apparatus for providing a conditional NOT trigger detection point using a video display terminal connected to a service switching point, comprising:

means for selecting an access type from a set of POTS, ISDN, TGRP, PBX, IPBX, and EXCH types;

means for selecting access identification number from a group of numbers in which number 0 is selected if EXCH is the selected type;

means for selecting a bearer service group from a group including NULL, 3P1, 64KBU, SPCH, BCHPS, 7KHZ services;

means for selecting a trigger detection point number ((WHY?)) from one to eighteen, means for selecting a TT ((WHAT??)) INDEX from 1 to 65535;

means for selecting a trigger detection point type as either a request type or a notification type; and logically combining the following criteria:
RECEIVED DIGITS,
CALLING PARTY NUMBER,
CLASS OF SERVICE,
CAUSE,
NATURE OF ADDRESS, and
BEARER CAPABILITY;

means for firing said trigger detection point if a logical NOT of said criteria is true; and means responsive to a firing of said firing means for transmitting a query to an SCP for instructions on what action to take next.

11. The apparatus of claim 10 wherein the criteria:
RECEIVED DIGITS,
CALLING PARTY NUMBER,
CLASS OF SERVICE,
CAUSE, NATURE OF ADDRESS, and
BEARER CAPABILITY
are data fields that have alphabetic, numeric and alphanumeric data entered by means of a video display terminal.

12. An apparatus providing a conditional AND trigger detection point using a video display terminal connected to a service switching point, comprising the steps of:
- means for selecting an access type from a set of types including POTS, ISDN, TGRP, PBX, IPBX, and EXCH types;
- means for selecting an access identification number;
- means for selecting a bearer service group from the set of NULL, 3P1, 64KBU, SPCH, BCHPS, 7KHZ services;
- means for selecting a trigger detection point number from 1 to 18;
- means for selecting a TT INDEX from 1 to 65535;
- means for selecting a trigger detection point type as either a request type or a notification type; and logically combining the following criteria:
  - RECEIVED DIGITS,
  - CALLING PARTY NUMBER,
  - CLASS OF SERVICE,
  - CAUSE,
  - NATURE OF ADDRESS, and
  - BEARER CAPABILITY
- means for firing said trigger detection point if a logical AND of said criteria is true; and
- means responsive to a firing of said firing means for transmitting a query to an SCP for instructions on what action to take next.

13. The apparatus of claim 12 wherein the criteria:
RECEIVED DIGITS,
CALLING PARTY NUMBER,
CLASS OF SERVICE,
CAUSE,
NATURE OF ADDRESS, and
BEARER CAPABILITY
are data fields that have alphabetic, numeric and alphanumeric data entered by means of a video display terminal.

14. An apparatus providing a conditional OR trigger detection point using a video display terminal connected to a service switching point, comprising:
- means for selecting an access type from a set of POTS, ISDN, TGRP, PBX, IPBX, and EXCH types;
- means for selecting access identification number from a group of numbers in which number 0 is selected if EXCH is the selected type;
- means for selecting a bearer service group from a group including NULL, 3P1, 64KBU, SPCH, BCHPS, 7KHZ services;
- means for selecting a trigger detection point number from one to eighteen,
- means for logically OR combining the following criteria:
  - RECEIVED DIGITS,
  - CALLING PARTY NUMBER,
  - CLASS OF SERVICE,
  - CAUSE,
  - NATURE OF ADDRESS, and
  - BEARER CAPABILITY,
- means for firing said trigger detection point if a logical OR of said criteria is true; and
- means responsive to a firing means for transmitting a query to an SCP for instructions on what action to take next.

15. The apparatus of claim 14 wherein the criteria:
RECEIVED DIGITS,
CALLING PARTY NUMBER,
CLASS OF SERVICE,
CAUSE,
NATURE OF ADDRESS, and
BEARER CAPABILITY
are data fields that have alphabetic, numeric and alphanumeric symbols entered therein by means of a video display terminal.

* * * * *